United States Patent
Schopf et al.

(10) Patent No.: US 9,028,198 B2
(45) Date of Patent: May 12, 2015

(54) WORKPIECE HANDLING SYSTEMS AND RELATED DEVICES AND METHODS

(75) Inventors: Ralf Schopf, Ditzingen (DE); Andreas Kettner-Reich, Stuttgart (DE); Simon Reinwald, Calw-Hirsau (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 189 days.

(21) Appl. No.: 13/404,383

(22) Filed: Feb. 24, 2012

(65) Prior Publication Data

US 2012/0219396 A1     Aug. 30, 2012

(30) Foreign Application Priority Data

Feb. 25, 2011   (EP) .................................... 11155941

(51) Int. Cl.

| | |
|---|---|
| B66F 11/00 | (2006.01) |
| B23K 26/38 | (2014.01) |
| B23K 37/02 | (2006.01) |
| B23K 37/047 | (2006.01) |
| B23K 37/053 | (2006.01) |
| B23Q 7/06 | (2006.01) |
| B23Q 7/08 | (2006.01) |

(52) U.S. Cl.
CPC ............. *B23K 26/38* (2013.01); *B23K 37/0229* (2013.01); *B23K 37/047* (2013.01); *B23K 37/053* (2013.01); *B23K 2201/06* (2013.01); *B23Q 7/06* (2013.01); *B23Q 7/08* (2013.01)

(58) Field of Classification Search
USPC .......... 414/745.1, 745.7, 745.9, 746.4, 746.8, 414/22.51–22.71, 910, 911, 14–20
See application file for complete search history.

(56) References Cited

U.S. PATENT DOCUMENTS

| | | | | | |
|---|---|---|---|---|---|
| 2,279,340 | A | * | 4/1942 | Postlewaite | .................... 118/108 |
| 2,692,565 | A | * | 10/1954 | Cummings | .................... 104/236 |
| 2,900,091 | A | * | 8/1959 | Minter | ......................... 414/22.62 |
| 3,419,159 | A | * | 12/1968 | Schaller et al. | ............. 414/746.3 |
| 3,618,741 | A | * | 11/1971 | Berndt | ........................ 198/463.5 |
| 3,810,553 | A | * | 5/1974 | Crocker et al. | ............. 414/22.61 |
| 4,049,043 | A | * | 9/1977 | Fort et al. | ........................ 164/295 |
| 4,313,329 | A | * | 2/1982 | Caswall et al. | .................. 72/290 |
| 4,389,148 | A | * | 6/1983 | Lorenz | ......................... 414/794.3 |

(Continued)

FOREIGN PATENT DOCUMENTS

| | | |
|---|---|---|
| DE | 10249106 A1 | 4/2004 |
| DE | 102008016733 A1 | 10/2009 |

(Continued)

*Primary Examiner* — Saul Rodriguez
*Assistant Examiner* — Lynn Schwenning
(74) *Attorney, Agent, or Firm* — Fish & Richardson P.C.

(57) ABSTRACT

In some aspects, an unloading device for a pipe processing system includes a depositing carriage having a depositing surface for depositing a pipe during and/or after a pipe processing operation, the depositing carriage being configured to move in a longitudinal direction of the pipe, and a supporting carriage having a supporting member for the pipe, the supporting member having a wall for radially supporting the pipe, and the supporting carriage being configured to move in a longitudinal direction of the pipe, where the depositing surface of the depositing carriage and/or the supporting member of the supporting carriage is configured to move in at least one other direction in addition to the longitudinal direction of the pipe so that the depositing carriage and the supporting carriage can be at least partially moved past each other along the longitudinal direction of the pipe.

7 Claims, 3 Drawing Sheets

(56) References Cited

U.S. PATENT DOCUMENTS

| | | | | |
|---|---|---|---|---|
| 4,422,815 | A | * | 12/1983 | Danhof ................... 193/31 A |
| 4,462,749 | A | * | 7/1984 | Crocker et al. ........... 414/745.9 |
| 4,486,137 | A | * | 12/1984 | Buckner .................. 414/22.61 |
| 5,108,245 | A | * | 4/1992 | Palmer ....................... 414/17 |
| 5,366,334 | A | * | 11/1994 | Cucchi ........................ 414/15 |
| 5,896,793 | A | * | 4/1999 | Haller et al. ................. 82/126 |
| 6,012,893 | A | * | 1/2000 | Drei et al. ................ 414/746.4 |
| 6,335,508 | B1 | | 1/2002 | Nam |
| 2008/0135531 | A1 | | 6/2008 | Widmann et al. |
| 2010/0264121 | A1 | | 10/2010 | Dilger |

FOREIGN PATENT DOCUMENTS

| | | |
|---|---|---|
| DE | 202008014371 U1 | 5/2010 |
| EP | 0901874 A2 | 3/1999 |
| EP | 1002622 A2 | 5/2000 |
| EP | 1026128 A2 | 8/2000 |
| EP | 2017023 A1 | 1/2009 |
| FR | 2792864 A1 | 11/2000 |
| KR | 1020100054781 | 5/2010 |
| WO | 2005014223 A2 | 2/2005 |
| WO | 2009121334 A1 | 10/2009 |

\* cited by examiner

WORKPIECE HANDLING SYSTEMS AND RELATED DEVICES AND METHODS

CROSS-REFERENCE TO RELATED APPLICATION

This application claims priority under 35 U.S.C. §119 to European Patent Application No. EP 11 155 941.5, filed on Feb. 25, 2011. The contents of this priority application are hereby incorporated by reference in their entirety.

TECHNICAL FIELD

The present invention relates to workpiece handling systems and to related devices and methods.

BACKGROUND

To unload processed workpieces from a pipe cutting machine, various unloading devices have been proposed. Some unloading devices include a discharge station having a pivotable unloading table with recesses in which supporting members for the pipe are arranged. The supporting members can be lowered, and long pipes can rest on the supporting members during processing.

EP901874A2 discloses a pipe cutting machine having a carriage that can be moved along a longitudinal axis of the pipe cutting machine in a controlled manner and can be used to supply and unload pipes. The carriage has controllable grippers for receiving the pipes.

DE10249106B4 discloses a pipe cutting machine having a carriage that can be moved in a controlled manner and can carry various auxiliary devices (e.g., support rollers to support pipes or a movable unloading flap) in order to support pipes to be processed or pipes that have been processed in order to guide them or discharge them from the pipe cutting machine.

EP1026128B1 discloses a device that has a receiving and discharge device for pipes having a pincer roller formed from two support pipes. In order to transfer separated pipe components from a pipe workpiece to a transport device without mechanical loading, the receiving and discharge device has resilient plates that direct the separated pipe portions into receiving members of the transport device.

U.S. Pat. No. 6,335,508B1 discloses a pipe handling system by which a laser processing device for processing planar workpieces can be converted into a pipe processing device. The pipe handling system has two carriages that can be moved in the longitudinal direction of the pipe, the first of which serves to clamp the pipe and the second to support the pipe. The second carriage has a gripper in order to also securely clamp the pipe so that it can be moved along its longitudinal direction in a common displacement direction with the first carriage.

SUMMARY

The systems and methods described herein provide a supporting carriage for an unloading device and a method for unloading a pipe using such an unloading device, which readily allow the unloading of pipes of different lengths and, in particular, allow the pipes to be sorted.

In the context of this disclosure, the term pipe is intended to refer to an elongate member (e.g., an elongate workpiece) whose length is generally greater (e.g., significantly greater) than its cross-sectional width and that is produced from a substantially non-flexible material. Pipes may have any open or closed cross-sectional shape. Round and rectangular pipes are examples of the common types of pipes. Components that are produced from pipes by laser cutting are referred to in the context of this disclosure as pipe components.

In some aspects, an unloading device of a processing system for processing pipes includes a depositing carriage which can be moved (e.g., in a controlled manner) in a longitudinal direction of the pipe and has a depositing surface for depositing a pipe thereon during and/or after a processing operation. The unloading device further includes at least one supporting carriage that can be moved (e.g., in a controlled manner) in the longitudinal direction of the pipe. Each of the supporting carriage(s) has at least one supporting member for the pipe having a wall for radially supporting the pipe. At least the depositing surface of the depositing carriage and/or the supporting member(s) of the supporting carriage(s) can move in at least one other direction in such a manner that the depositing carriage and the supporting carriage(s) can be at least partially (e.g., completely) moved past each other in the longitudinal direction of the pipe.

The supporting member(s) and/or the depositing surface can be moved not only in the longitudinal direction of the pipe, but also in at least one other direction. The movement in the other direction is carried out either by moving the depositing or supporting carriage(s) as a whole or by moving the depositing surface or the supporting member(s) relative to the depositing or supporting carriage(s). The depositing surface or the supporting member(s) is positioned below the pipe that is to be deposited or supported during the processing. Due to the additional movement in the direction other than the longitudinal direction of the pipe, a collision between a supporting carriage or the supporting member thereof and the depositing carriage or the depositing surface thereof can be prevented when both the supporting and depositing carriages are moved past each other in the longitudinal direction of the pipe. If the evasive movement of a carriage is carried out transversely relative to the longitudinal direction of the pipe or the machine axis, the depositing surface and the supporting member or the depositing carriage and the supporting carriage(s) can also be positioned beside each other in the longitudinal direction of the pipe. Consequently, it is possible to selectively arrange the depositing carriage or the supporting carriage(s) adjacent to the processing location (e.g., in the region of the processing head) and support a pipe or pipe component at that location.

In this manner, it is possible to process short pipe components without support by a supporting member of the unloading device and to deposit them after the processing operation on the depositing carriage positioned for this purpose next to the processing location. During processing of long pipe components and in order to unload them, the long pipe components can be supported by at least two of the supporting carriages with supporting members. One of the at least two supporting carriages is positioned close to the processing location.

The unloading device consequently allows both the support and guiding of long pipe components during the processing operation and the unloading and sorting of workpiece components of different lengths. Separated pipe components can be discharged by both the depositing carriage and by the supporting carriage(s) directly at the processing location or, alternatively, transported to another position in the longitudinal direction and unloaded at that location, as described in detail below.

In some embodiments, the depositing carriage and the at least one supporting carriage are fitted to guide rails of a carrier (e.g., a longitudinal carrier) that extends in the longitudinal direction of the pipe. The guide rails allow simple and inexpensive guiding of the depositing carriage and the supporting carriage(s). Using controllable drives, the depositing carriage or the supporting carriage(s) can be moved in a controlled manner along the guide rails independently of one another and advanced in a desired position along the carrier in order to support a pipe or pipe component at that location. Such guide rails can also be fastened to the floor surface on which the processing system is located so that the depositing carriage and the at least one supporting carriage can be moved directly on the floor. An evasion movement can also be carried out, for example, on a branch of one of the guide rails. The depositing carriage or the at least one supporting carriage can, for example, be moved along a branching guide rail portion that extends in a direction that differs from the longitudinal direction of the pipe.

The depositing carriage and the at least one supporting carriage may be fitted to opposing sides of the carrier. The guide rails to guide the depositing carriage and the guide rails to guide the supporting carriage(s) extend at opposing sides of the carrier, whereby a collision of the depositing carriage with the supporting carriage(s) in the region of the guide rails can be prevented. The guide rails can also be fitted at the same side of the carrier. However, it may be necessary for the guide rails to be arranged at different heights and have sufficient spacing from each other in order to prevent collisions between the depositing carriage and the supporting carriage(s).

In some embodiments, the depositing carriage has an extension arm for moving the depositing surface of the depositing carriage transversely relative to the longitudinal direction of the pipe or the machine axis. The depositing surface can be moved away from the machine longitudinal axis when the supporting carriage(s) that carry the supporting members are intended to be positioned beside the processing location so that collisions can be prevented in a simple manner.

In some embodiments, the depositing surface of the depositing carriage is height-adjustable. The supporting carriage(s) can then be moved below the depositing surface or vice versa. The height adjustment of the depositing surface that can be produced, for example, by fitting the depositing surface to a vertically moveable carriage that can be adjusted in a controlled manner can also be used to position the depositing surface on the enveloping circle of the pipe that is intended to be supported by the depositing surface.

The depositing surface can be shaped so that it forms a central recess region that extends along the longitudinal direction of the pipe, and on both sides of the central recess region, the outer edges of the depositing surface extend upward away from the central recess region. Using such a depositing surface, lateral rolling away or sliding away of pipe components supported by the depositing surface can be prevented.

In some embodiments, the depositing surface of the depositing carriage can be pivoted between a first horizontal position for depositing the pipe and a second inclined position for discharging the pipe. In order to pivot between the two positions, a pivot device (e.g., a hydraulic or pneumatic cylinder) can be used. A piston of the pivot device engages a free end of the depositing surface to affect this pivoting movement.

In some embodiments, the supporting member of the supporting carriage(s) is height-adjustable and the each supporting carriage has at least one inclined discharge bar that is laterally offset relative to the supporting member. When multiple supporting carriages are used, at least one of the supporting carriages has a discharge bar in front of and behind the supporting member along the longitudinal direction of the pipe, respectively, while the remaining supporting carriages can have only one discharge bar. If the supporting member is lowered a sufficient distance, the pipe or pipe component no longer rests on the supporting member, but instead rests on the discharge bars and can slide or roll along them and can move into a container that is arranged beside the machine bed or onto a transport device (e.g., a conveyor belt). The height adjustability of the supporting member also allows adaptation to the enveloping circle of the pipe or pipe component to be supported. The supporting member can be constructed as a fixed molded shell or as a rotatably supported supporting roller. The rotatably supported supporting roller allows a relative movement between the pipe or pipe component and the supporting carriage in the longitudinal direction of the pipe, which is typically not permitted when using the depositing surface of the depositing carriage or the molded shell.

In some embodiments, the supporting member can be lowered into an intermediate position in which the pipe rests on the discharge bar(s) and is retained on the discharge bar(s) by the wall of the supporting member. In this case, the wall of the supporting may have a straight edge for retaining the pipe in the intermediate position. In the intermediate position, the pipe or pipe component rests on the discharge bar(s) so that the pipe or pipe component, in the event of a movement of the supporting carriage(s) in the longitudinal direction of the pipe, cannot change the relative position with respect to the supporting carriage(s) since the supporting member no longer carries out a rotation movement. The wall of the supporting member can reduce the likelihood of the pipe or pipe component sliding along the discharge bar. The stability when retaining the pipe or pipe component on the discharge bar can be improved if the wall has a substantially straight edge that extends (e.g., continuously) in a vertical direction from a semi-circular wall region for radial support. If the supporting members are arranged in the intermediate position, the pipes or pipe components can be transported in the longitudinal direction of the pipe, for example, in order to supply them for sorting to various containers.

In some embodiments, an angular position of the discharge bar can be adjusted and/or the discharge bar can include a sliding rail that can be exchanged or replaced. The angular position of the discharge bar can be adjusted (e.g., manually) to accommodate a particular type of pipe (e.g., a pipe having a particular cross-sectional shape or size). On the discharge bar there may be a sliding rail along which the pipe or pipe component slides or rolls. Since the sliding rails are typically components that may wear during use, they can be replaced, for example, using a screw connection, and can be exchanged when necessary. In particular, depending on the application (e.g., depending on the pipe material), sliding rails of different materials (e.g., metals, plastics material, textiles, or other materials) can be used.

In some embodiments, the unloading device has an inclined unloading surface that abuts the depositing surface and/or the discharge bar transversely relative to the longitudinal direction of the pipe. The upper end of the inclined unloading surface is arranged at a height that corresponds to the height of the lower end of the discharge surface in the inclined position or the discharge bars in order to transfer pipes or pipe components into collection containers or transport devices in a controlled manner. Due to the stationary unloading surface, the depositing surface or the discharge bars, when moving in the longitudinal direction of the pipe, can be prevented from colliding with poorly positioned collection containers or becoming caught at that location.

Another aspect of the invention relates to a supporting carriage for receiving and supporting a pipe during and/or after the processing operation on a processing system. The supporting carriage carries a supporting member that can be rotatably supported and has a wall along which the pipe can be supported in a radial direction. The supporting carriage has at least one inclined discharge bar spaced laterally relative to the supporting member, and the supporting member is able to be lowered in such a manner that the pipe rests on the discharge bar and is retained on the discharge bar by at least one retention element.

Retention elements can include, for example, retention pins that are laterally fixed to the discharge bars and can be moved vertically or pivoted. The retention pins can be moved or pivoted into a retention position in order to retain the pipe on the discharge bar. If the pipe is intended to be discharged, the retention pins can be moved or pivoted downwards into a position in which they no longer touch the pipe so that the pipe can slide or roll away.

In some embodiments, the retention element is formed by the supporting member that can be lowered into an intermediate position and can be fixed in this position. The pipe in the intermediate position rests on the discharge bar and is retained by the wall of the supporting member on the discharge bar.

As discussed above, a relative movement between the supporting carriage(s) and pipe or pipe component can be prevented in the intermediate position so that the pipe or pipe component can be transported by the supporting carriage(s) in the longitudinal direction of the pipe. In the non-lowered position of the supporting member, however, the supporting member may be freely rotatable about the axis thereof so that the supported pipe or pipe component can be moved relative to the supporting carriage in the longitudinal direction of the pipe during a feed movement. In order to lower or raise the supporting member, a displacement device for controlled displacement of the supporting member can be provided on the supporting carriage. For example, the supporting member may be secured to a carriage that can be moved in a controlled manner relative to the base member of the supporting carriage (e.g., by a motor). Alternatively to the wall of the supporting member, retention devices (e.g., retention pins) that are not connected to the supporting member may be provided on the supporting carriage for retaining the pipe or pipe component on the discharge bar in the intermediate position.

As discussed relative to the unloading device, an angular position of the discharge bar can be adjustable. The discharge bar can also be provided with a replaceable sliding rail. The wall of the supporting member(s) can also have a straight (e.g., vertical) edge that extends from a wall region that is, for example, semi-circular, in order to help secure rotation of pipe profile-members having a non-round (e.g., angular) cross-section without becoming caught. The edge can also be used for retaining or stabilizing the pipe during transport in the longitudinal direction when the supporting member is located in the intermediate position.

In another aspect, a method for unloading a pipe includes selectively positioning a depositing carriage and/or a supporting carriage in the region of a processing location of a processing system by moving the depositing carriage and/or the supporting carriage in the longitudinal direction of the pipe. At least the depositing surface of the depositing carriage and/or the supporting member of the supporting carriage is moved in at least one other direction, in order to move the depositing carriage and the supporting carriage at least partially past each other in the longitudinal direction of the pipe. The method further includes depositing the pipe on the depositing surface of the depositing carriage which is positioned in the region of the processing location or on the supporting member of the supporting carriage which is positioned in the region of the processing location.

Other advantages of the invention will be appreciated from the description and the drawings. The features mentioned above and those set out in greater detail below can also be used individually or together in any combination. The embodiments illustrated and described are not intended to be understood to be a definitive listing but are instead of exemplary character in order to describe the invention.

DETAILED DESCRIPTION

Figure 1:
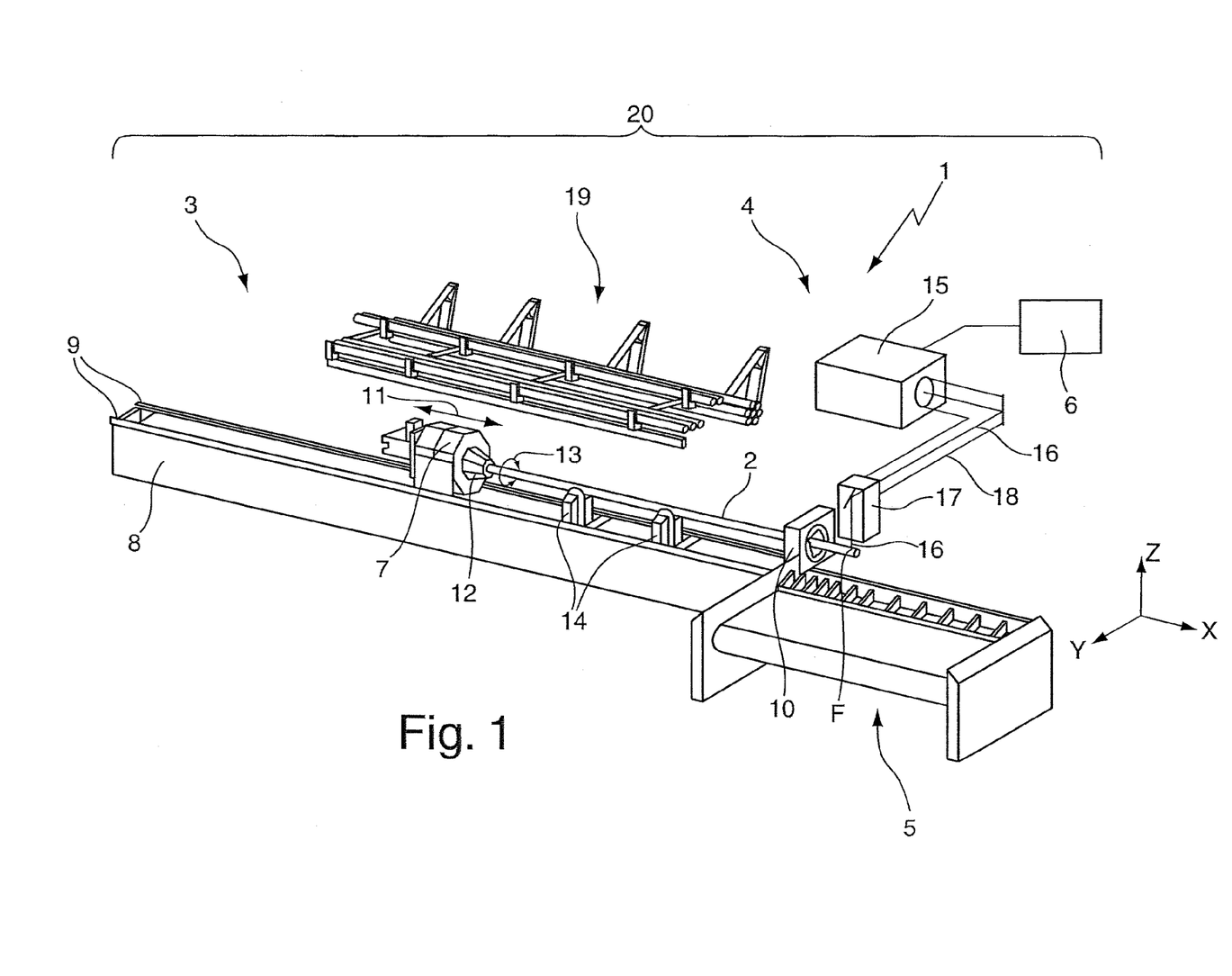
FIG. 1 is a schematic illustration of a processing system for laser cutting pipes.

FIG. 1 illustrates a processing system (e.g., a laser cutting system) for laser cutting pipes 2. The laser cutting system 1 is constructed for processing pipes having various cross-sectional shapes. The illustrated laser cutting system 1 includes a supply device 3 for laterally moving a pipe 2 to be cut by the laser cutting system 1, a processing device 4 for laser cutting pipe components from the pipe 2 and an unloading device 5 for unloading the cut pipe components from the laser cutting system 1. Most of the functions of the laser cutting system 1 are controlled by a numerical control device 6.

The supply device 3 includes a rotation and feed device 7 that acts as a workpiece movement device, a machine bed 8 having guide rails 9, and a push-through device 10. The rotation and feed device 7 can be moved in the feed direction 11 on the guide rails 9 in a motor-driven manner. At the side facing a pipe 2 to be supplied, the rotation and feed device 7 has a clamping device 12 that can be rotated in a controlled manner in the direction of the double-headed arrow 13 and surrounds the supplied pipe 2 from the outer side and clamps it in a fixed manner. The supplied pipe 2 is supported by at least one workpiece support 14 that is integrated in the machine bed 8. In the region of the processing device 4, the pipe 2 is guided by the push-through device 10. The push-through device 10 is constructed in such a manner that the clamped pipe 2 is guided in the feed direction 11 and not clamped in a fixed manner. The pipe 2 can be rotated in the push-through device 10 about an axis of rotation, as indicated by the arrows 13.

The processing device 4 includes a laser beam source 15 for generating a laser beam 16, a processing head 17, and a beam guide 18 that guides the laser beam 16 from the laser beam source 15 to the processing head 17. The laser beam 16 exits the processing head 17 and is focused at a processing location F onto the outer peripheral surface of the clamped pipe 2. At the side of the push-through device 10 facing away from the machine bed 8, the unloading device 5 discharges the pipe components cut from the pipe 2 and the remaining pipe from the laser cutting system 1.

In order to increase the productivity of the laser cutting system 1, the laser cutting system 1 illustrated in FIG. 1 has an automated loading device 19 by which a pipe 2 is automatically conveyed into a transfer position and transferred to the supply device 3 of the laser cutting system 1. The mechanical arrangement including the laser cutting system 1 and the loading device 19 is referred to as a production cell 20.

When the pipe 2 supplied via the loading device 19 is arranged in the transfer position, the rotation and feed device 7 is first in an initial position away from the processing head. In order to process the pipe 2, the rotation and feed device 7 moves with the clamping device 12 open towards the supplied pipe 2 until the end of the pipe 2 remote from the processing head 17 comes to rest within the clamping device 12. The clamping device 12 is then closed and the pipe 2 is thereby clamped in a fixed manner to the rotation and feed device 7. The rotation and feed device 7 and the pipe 2 then move together towards the processing head 17. The pipe 2 first enters the push-through device 10 with its end facing the processing head 17 and is moved in a feed direction 11 through the push-through device 10. The pipe 2 is able to be rotated in the push-through device 10, as indicated by the arrows 13. The pipe 2 is advanced by the displacement movement of the rotation and feed device 7 in the feed direction 11 with respect to the processing head 17 into the desired processing position.

Figure 2:
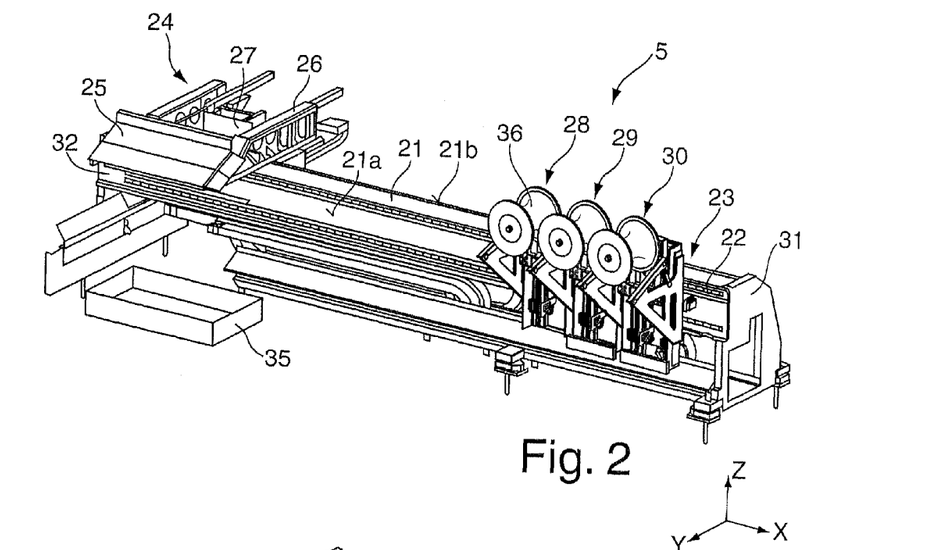
FIG. 2 is a schematic illustration of an unloading device having a depositing carriage and three supporting carriages which can each be moved in a longitudinal direction of a pipe in a controlled manner.

FIG. 2 is a schematic illustration of an unloading device 5 that can be used with the laser cutting system of FIG. 1. The unloading device 5 has a longitudinal carrier 21 that abuts the machine bed 8 (shown in FIG. 1) in the longitudinal direction of the pipe (e.g., in an X direction of the illustrated XYZ coordinate system). At opposing sides 21a, 21b of the carrier 21, guide rails 22, 23 extend in the longitudinal direction X of the pipe. The guide rails 23 are fitted to the rear side 21b of the carrier 21 and are concealed by the carrier 21 in FIG. 2.

A depositing carriage 24 is arranged on the guide rail 23, which is fitted to the side 21b of the carrier 21 facing away from the pipe. The depositing carriage 24 is guided along the guide rail 23 in the longitudinal direction X and can be controlled and moved in a controlled manner by a drive using the control device 6 illustrated in FIG. 1. The depositing carriage 24 has a depositing surface 25 that can be advanced and retracted using an extension arm 26 in a direction (e.g., the Y direction) that is substantially transverse relative to the longitudinal direction X of the pipe. The depositing surface 25 has a generally flat central recess region that extends along the longitudinal direction of the pipe, and on both sides of the central recess region, the outer edges of the depositing surface extend upward and away from the central region. The depositing carriage 24 can be advanced beyond the upper side of the carrier 21 so that the depositing surface 25 no longer protrudes into the region of the side 21a of the carrier 21.

The transverse extension arm 26 is fitted to a vertically movable carriage 27 of the depositing carriage 24. The vertically moveable carriage 27 can be moved using a drive so that the depositing surface 25 of the depositing carriage 24 can be moved in a program-controlled manner (e.g., using the control device 6) in a vertical direction (e.g., the Z direction) and thus can be positioned on the diameter or enveloping circle of the processed pipes. Dynamic height positioning dependent on the rotation position of the processed pipe or pipe component is also possible.

Also illustrated in FIG. 2, three supporting carriages 28, 29, 30 are arranged in the longitudinal direction of the pipe at a rest position at a first end 31 of the carrier 21 that faces away from the push-through device 10. The supporting carriages 28, 29, 30 are fitted to the guide rails 22 at the side 21a of the carrier 21 facing the pipe. The supporting carriages 28, 29, 30 can be moved from the rest position to a second end 32 of the carrier 21 in the region of a processing position F located adjacent to the push-through device 10, as described in greater detail below. The supporting carriages 28, 29, 30 can be controlled separately from each other using motors so that they can be individually displaced in the longitudinal direction X of the pipe. The supporting carriages 28, 29, 30 can also be displaced synchronously in the longitudinal direction X of the pipe.

Figure 4:
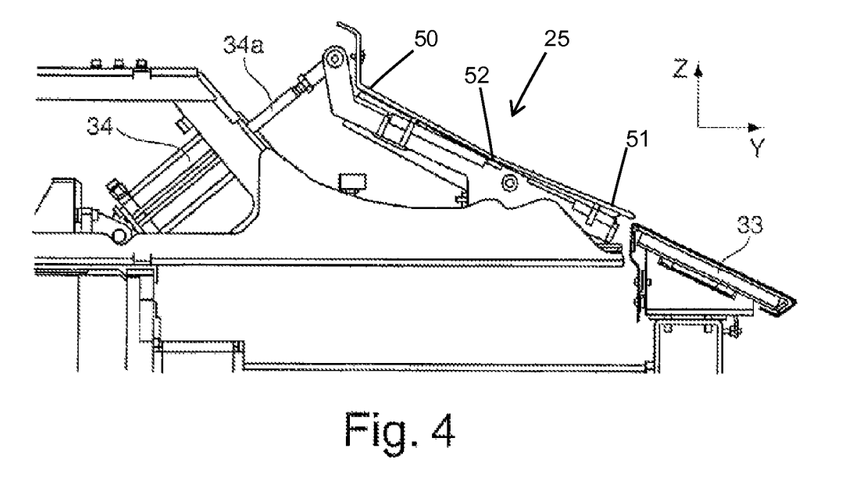
FIG. 4 is a side view of the depositing surface in the inclined position.

The depositing surface 25 of the depositing carriage 24 illustrated in FIG. 2 can be pivoted between a first angular position (e.g., a horizontal position) and a second angular position (e.g., an inclined position). In the first horizontal position, pipe components are deposited on the depositing surface 25 without rolling or sliding away. When separating pipe components from the unprocessed pipe, the depositing carriage 24 is positioned below the pipe component to be deposited. As shown in FIG. 4, the depositing surface 25 whose outer edges 50, 51 extend upward from the central recess region 52 help prevent resting pipes or pipe components from rolling away or sliding away at the sides. Pipe components deposited in the horizontal position on the depositing surface 25 can subsequently be transported by moving the depositing carriage 24 in the longitudinal direction X to another position along the carrier 21 and can be unloaded manually or by tilting the depositing surface 25 in the manner shown in FIG. 2. In this manner, sorting of components into various containers along the carrier 21 is possible.

In the second inclined position of the depositing surface 25, as illustrated in FIG. 2, pipe components are received which are intended to roll or slide to the side (e.g., in the Y direction that is transverse to the longitudinal direction X of the pipe) into a container or onto a conveyor belt.

In order to help to ensure reliable unloading of the pipe components and a transfer to collection containers or transport devices, an inclined unloading surface 33 (illustrated in FIG. 3) is offset in a direction Y relative to the carrier 21 and extends in the longitudinal direction X of the pipe along the entire carrier 21. An upper end of the unloading surface 33 adjoins a lower end of the depositing surface 25 when the depositing surface 25 is in the inclined position (illustrated in FIG. 4).

As illustrated in FIG. 4, a hydraulic cylinder 34 serves to pivot the depositing surface 25 from the first, horizontal position into the second, inclined position (and vice versa). To do so, a free end of the depositing surface 25 is coupled to a piston rod 34a of the hydraulic cylinder 34.

The unloading surface 33 serves, for example, to prevent the moved depositing surface 25 from becoming caught on poorly positioned collection containers. The inclined unloading surface 33 is typically arranged in the vertical direction (e.g., the Z direction) with its lower end positioned so that the pipe components can be discharged into containers (e.g., baskets) at a discharge height (e.g., 900 mm) without additional lifting devices.

In order to discharge short finished components at various positions along the longitudinal axis X of the unloading device 5, the depositing carriage 24 is moved in the longitudinal direction X in a program-controlled manner. In order to achieve a greater movement path of the depositing carriage 24, the supporting carriages 28, 29, 30 (illustrated in FIG. 2) are positioned in the rest position at the end 31 of the carrier 21 facing away from the push-through device 10 or the processing head 17.

Figure 3:
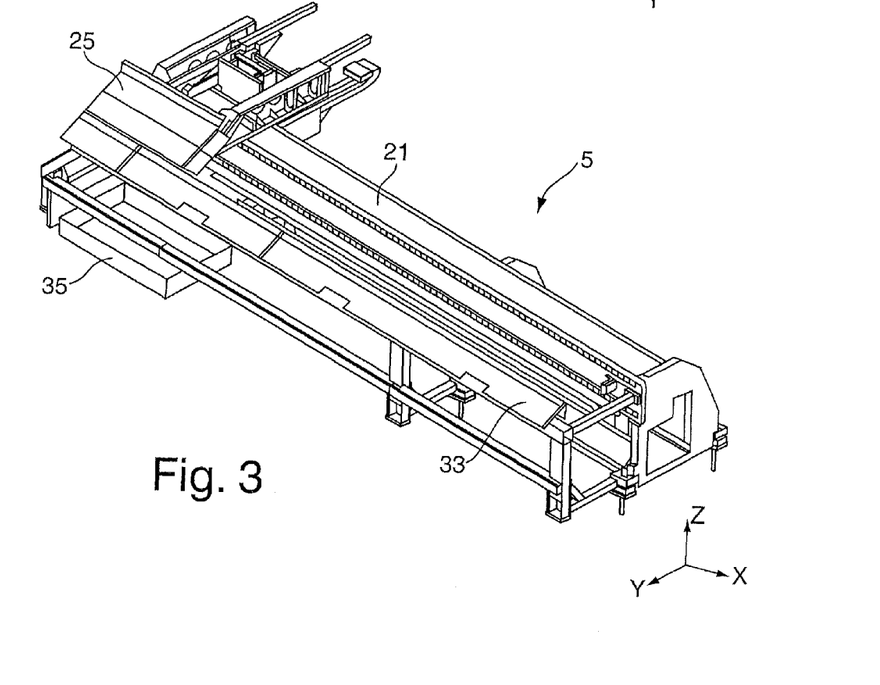
FIG. 3 is a schematic illustration of the unloading device of FIG. 2 with a depositing surface of the depositing carriage in an inclined position and with an inclined unloading surface. The unloading device is shown without the supporting carriages of FIG. 2.

In order to separate scrap portions and cutting waste produced during the processing operation from the pipe components and also to remove cuttings and pipe remnants, the depositing surface 25 can be positioned in the longitudinal direction X and/or in the Y direction spaced apart from the processing location F. Therefore, the waste portions are not deposited on the depositing surface 25 but fall into a container 35 arranged at or adjacent to the processing location F between the carrier 21 and the inclined unloading surface 33.

While the depositing carriage 25 serves to deposit relatively small pipes or pipe components, long pipes or pipe components are supported during the processing operation and during unloading by at least two of the supporting carriages 28, 29, 30. Depending on the length of the pipes, a different number of supporting carriages can be used. Typically, at least two supporting carriages are used. Supporting carriages that are not used to support a pipe or pipe component can remain in the rest position at the first end 31 of the carrier 21.

In order to support a pipe or pipe component with at least two of the supporting carriages 28, 29, 30, one of the supporting carriages 28 is typically positioned close to the processing location F (i.e., close to the second end 32 of the carrier 21). To do so, the depositing surface 25 of the depositing carriage 24 is moved in the Y direction perpendicular to the longitudinal direction of the carrier 21 by the transverse extension arm 26. The supporting carriage 28 can then be positioned beside the depositing carriage 24 or moved past the depositing carriage 24.

In order to prevent a collision between the depositing surface 25 of the depositing carriage 24 and the supporting carriage 28 during movement in the longitudinal direction X of the pipe, the depositing surface 25 is moved using the transverse extension arm 26 into a retracted position at the side 21b of the carrier 21 facing away from the pipe. The depositing surface 25 or the transverse extension arm 26 can alternatively or additionally be moved upwards (in the Z direction) by a vertically moveable carriage 37 so that the supporting carriages 28, 29, 30 can be moved below the depositing carriage 24. In this instance, it may be necessary to first move the depositing carriage 24 away from the processing location in order to prevent a collision of the depositing surface 25 with the pipe to be processed.

Figure 5:
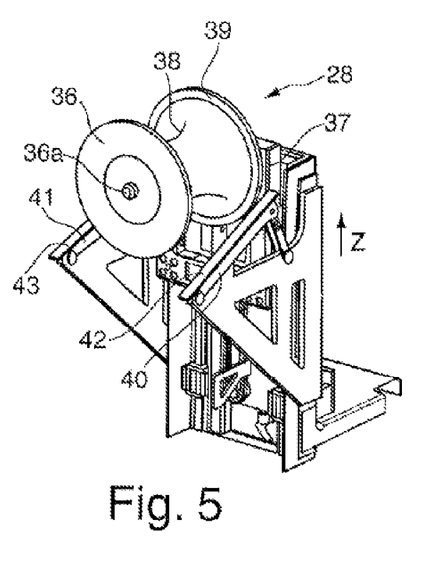
FIG. 5 is a schematic illustration of a roller-like supporting member of one of the supporting carriages of FIG. 2 with laterally fitted discharge bars.
Figure 6:
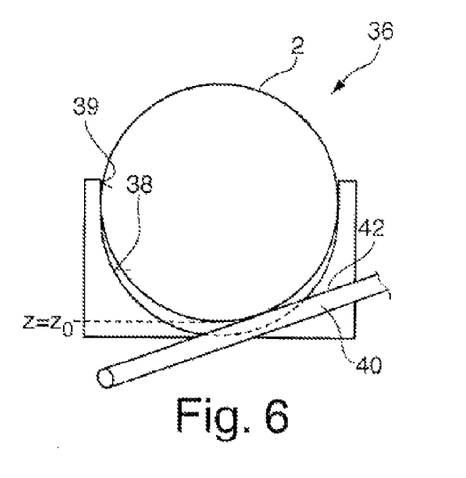
FIG. 6 is a side view of the roller-like supporting member of FIG. 5 in an intermediate position in which a pipe supported thereon in a radial direction rests on the discharge bars.

A collision with the depositing surface 25 can also be prevented if a supporting member 36 (e.g., in the form of a supporting roller as illustrated in FIGS. 5 and 6) of the first supporting carriage 28 is lowered downwards (in the Z direction) in a controlled manner. To do so, the supporting member 36 is fitted to a vertically moveable carriage 37 and can be moved in a controlled manner using a motor.

Using the control device 6, each of the supporting carriages 28, 29, 30 can be moved in a programmed manner independent of one another, both with respect to the vertical direction Z and the longitudinal direction X. The supporting carriages 28, 29, 30 or the supporting members 36 can also be moved synchronously in both the X and Z directions. It is also possible to provide two or more supporting members on a supporting carriage 28, 29, 30 for supporting a pipe or pipe component.

In addition to a lowering action in order to prevent a collision with the depositing surface 25 of the depositing carriage 24, a movement of the supporting member 36 in the Z direction is also possible in order to adapt to the enveloping circle or diameter of a pipe 2 which is circular in this example and is intended to be supported by the supporting member 36 (illustrated in FIG. 6). Also shown in FIGS. 5 and 6, the supporting member 36 is constructed in a rotationally symmetrical manner relative to a rotation axis 36a and has a semi-circular wall 38 for radially supporting the pipe 2 so that a pipe can be enclosed by 180° even when non-round pipes are being handled. The supporting roller 36 is rotatably supported on the supporting carriage 28 about the axis of rotation 36a, which enables a relative movement in the longitudinal direction X of the pipe between the pipe component 2 and the supporting carriage 28. The pipe component 2 can slide along the wall 38 during rotation.

An upper straight edge 39 of the supporting member 36 extends from the semi-circular wall 38 in a vertical direction. The straight vertical edge 39 of the supporting member 36 serves to stabilize the pipe component 2 during transport in the longitudinal direction X, as described below. The supporting member does not necessarily have to be constructed as illustrated in FIG. 5 and FIG. 6 as a supporting roller 36 but can also be constructed in a different manner. For example, in some embodiments, the supporting member is designed as a non-rotatable structure.

In order to unload pipes or pipe components, each supporting carriage 28, 29, 30 has one or two discharge bars 40, 41 whose angular position can be adjusted (e.g., manually adjusted) relative to the horizontal direction. The discharge bars 40, 41 are secured at their free ends with a predetermined spacing relative to the base member of the supporting carriage 36. Each of the discharge bars 40, 41 can be screwed in a corresponding screw hole which can be selected from a plurality of screw holes or secured by means of a catch pin.

Each discharge bar 40, 41 is provided at the upper surface with a sliding rail 42, 43 which, when the discharge bar 40, 41 becomes worn, can be removed and replaced. It is also possible to use sliding rails 42, 43 with different materials (e.g., metals, plastics, textiles, or other suitable materials) in order to reduce friction and provide for low-scratch unloading depending on the pipe material. When pipe components are unloaded, the supporting members 36 are lowered completely in the Z direction so that the pipe components can roll or slide away over the discharge bars 40, 41 and move to the adjacent, inclined unloading surface 33, in front of which a transfer to collection containers or to transport devices is possible.

In order to sort processed pipe components, the supporting member 36 can be lowered into an intermediate position ($Z=Z_0$), as illustrated in FIG. 6. In the intermediate position $Z_0$, although the pipe component 2 rests on the discharge bars 40, 41, it is retained by the straight edge 39 of the supporting member 36 so that it cannot slide off. During a displacement movement of the supporting carriages 28, 29, 30 in the longitudinal direction X, the pipe or pipe component supported thereon does not move relative to the supporting carriages 28, 29, 30 and is moved along the carrier 21 with the supporting carriages 28, 29, 30. When the pipe 2 has been moved into a desired position along the carrier 21, the supporting member 36 is moved further downwards so that the supported pipe or pipe component 2 slides along the discharge bars 40, 41 and is moved onto the inclined unloading surface 33.

Alternatively or in addition to retaining the pipe or pipe component 2 with the supporting member 36, it is also possible to use retention devices that are not connected to the supporting member 36. Such retention devices may, for example, be retention pins that are laterally secured to the discharge bars 40, 41, which can be adjusted in terms of height or pivoted and which are moved or pivoted into a retention position in order to retain the pipe 2 on the discharge bars 40, 41. To discharge the pipe 2, the retention pins can be moved downwards or pivoted into a position in which they no longer touch the pipe 2 so that it can slide or roll away.

As discussed herein, it is possible to produce a flexible unloading device 5 that readily allows the unloading of pipes or pipe components of different lengths and, in particular, sorting of the pipes or pipe components.

While the depositing carriage 24 have been described as being fitted to multiple guide rails 23 and the supporting carriages 28, 29, 30 have been described as each being fitted to multiple guide rails 22, other configurations are possible. For example, the depositing carriage 24 can be fitted to a single guide rail and/or each of the supporting carriages 28, 29, 30 can be fitted to a single guide rail.

A number of embodiments of the invention have been described. Nevertheless, it will be understood that various modifications may be made without departing from the spirit and scope of the invention. Accordingly, other embodiments are within the scope of the following claims.

What is claimed is:

1. A supporting carriage for receiving and supporting a pipe during and/or after a processing operation, the supporting carriage comprising:
    a supporting member that has a wall on which the pipe can be radially supported; and
    a slanted discharge bar disposed laterally relative to the supporting member, the supporting member configured to be lowered so that the pipe rests on the discharge bar and is retained on the discharge bar by at least one retention element,
    wherein the retention element is formed by the supporting member that can be lowered to an intermediate position in which the pipe rests on the discharge bar and is retained by the wall of the supporting member on the discharge bar,
    wherein the wall of the supporting member comprises a substantially straight edge for retaining the pipe in the intermediate position, the substantially straight edge extending in a vertical direction from a semi-circular wall region for radial support.

2. The supporting carriage according to claim 1, wherein an angular position of the discharge bar can be adjusted.

3. The supporting carriage according to claim 1, wherein the discharge bar includes a replaceable sliding rail.

4. The supporting carriage according to claim 1, wherein the supporting member of the supporting carriage is vertically adjustable and the supporting carriage has a slanted discharge bar that is laterally offset relative to the supporting member.

5. The supporting carriage according to claim 4, wherein the supporting member can be lowered into an intermediate position in which the pipe rests on the discharge bar and is retained on the discharge bar by the wall of the supporting member.

6. The supporting carriage according to claim 4, wherein an angular position of the discharge bar can be adjusted.

7. The supporting carriage according to claim 4, wherein the discharge bar includes a replaceable sliding rail.

* * * * *